United States Patent Office 3,425,842
Patented Feb. 4, 1969

3,425,842
FOOD SPREADS CONTAINING OLEAGINOUS GELS
Cornelis Japikse, Springfield Township, Hamilton County, Ohio, assignor to The Procter & Gamble Company, Cincinnati, Ohio, a corporation of Ohio
No Drawing. Filed Apr. 25, 1966, Ser. No. 544,694
U.S. Cl. 99—122          13 Claims
Int. Cl. A23d 3/00

ABSTRACT OF THE DISCLOSURE

A food spread is made from about 1% to about 10% by weight milk solids, about 5% to about 50% by weight water, and from about 45% to about 90% by weight of an oleaginous gel. This gel has a stable beta crystalline phase comprising from 92% to about 98% by weight of liquid glyceride oil having an iodine value of about 100 to about 120 and about 2% to 8% by weight of solid triglyceride having an iodine value not exceeding about 12. The solid triglyceride consists essentially of a blend of (a) beta-phase-tending hardstock and (b) non-beta-phase-tending hardstock having a substantial portion of fatty acid groups having 20 to 24 carbon atoms. The weight proportion of (a) to (b) in the solid triglyceride blend ranges from about 1:4 to about 4:1. The solid triglycerides have stable individual crystals up to about 10 microns, at least 70% being in the beta phase.

---

This invention relates to novel margarine compositions which have improved consumer appeal and to a method of their preparation. More specifically, it relates to margarines which have a relatively uniform content of solid fat at all temperatures of use.

Margarine consists of an emulsion of two phases, one aqueous in nature and the other oleaginous in nature. Consumers have established rigid standards for margarine. Margarine must have an acceptable flavor and it must possess a desirable eating quality; that is, the oleaginous portion must not give a waxy impression when eaten. Margarine must also retain its original shape and texture, but not be unduly firm at use temperatures.

This combination of properties is not easily attained. The eating quality of prior art margarines in large part is determined by the amount of substantially solid triglyceride present; the eating quality increases as the amount of solid triglyceride is decreased. However, as the amount of solid triglyceride is decreased, the consistency of prior art margarines is adversely affected. This is because prior art margarines obtain their plastic consistency from interconnecting bonds between solid triglyceride crystals which are formed during the chilling operation in preparing the margarine. Without a sufficiently large amount of solid triglyceride present, there is insufficient bonding strength to give the margarine the desired plastic consistency.

Without a sufficiently large amount of solid triglyceride present, there is insufficient bonding strength to give the The consistency problem is accentuated by the practice of refrigerating margarines. While the margarine is customarily stored at temperatures of about 40°–45° F., the ambient use temperatures vary from normal room temperatures (about 70°–75° F.) to temperatures customarily encountered in warmer climates or in overheated kitchens (e.g., 85° F. or higher). The margarine can be at temperatures within any of these ranges when used, depending on how long the margarine has been removed from refrigeration. It has been difficult to prepare margarines which have a spreadable consistency over this entire range.

The above-described problems can be reduced to some extent by careful selection and blending of oils and solid triglyceride materials to produce margarines in which the amount of solid material present changes significantly over the temperature range in question.

A commonly accepted method of evaluating margarines has been by reference to the "Solids Content Index" (SCI) of the oleaginous portion of the margarine, which is a measure of the percent of the fat which is present in the solid state at the temperature of measurement. While diversity of opinion does exist relative to the exact figures which separate acceptable from unacceptable margarines, it is commonly agreed that the SCI of the oleaginous portion of a margarine should drop sharply between room temperature and body temperature and that a margarine with a relatively small change in SCI between these temperatures is not desirable. Typically, for acceptable eating quality, a maximum SCI of about 1 to 4 at body temperature has been required; for acceptable consistency, a SCI of about 15 to 25 has been required at about 75° F.

A compromise often has been made in preparing prior art margarines. The margarine either was given a sufficient solid triglyceride content to produce a product which was firm at room temperature, which in turn generally made the product exceedingly firm or even hard at refrigeration temperature and possibly gave the product a less desirable eating quality, or else the margarine was given an amount of solid triglyceride which made it spreadable at or near refrigerator temperature while sacrificing firmness at the higher temperatures normally encountered.

It is an object of this invention to provide a margarine product which is spreadable at both refrigeration and room temperatures, and to provide a method for its production.

It is a further object of this invention to provide a margarine product which has good flavor, acceptable eating quality, and a SCI which remains relatively constant over the range of common use temperatures.

These and other objectives are achieved by providing a margarine comprising from about 1% to about 10% milk solids, from about 5% to about 50% water, and from about 45% to about 90% of an oleaginous gel having a stable beta crystalline phase comprising from 92% to about 98% by weight of liquid glyceride oil having an iodine value greater than about 75 and from about 2% to 8% by weight of solid triglyceride having an iodine value not exceeding about 12, said solid triglyceride consisting essentially of a blend of (a) beta-phase-tending hardstock and (b) non-beta-phase-tending hardstock having a substantial portion of fatty acid groups having 20 to 24 carbon atoms, the proportion of (a) to (b) in said solid triglyceride blend ranging from about 1:4 to about 4:1, said solid triglyceride having stable individual crystal size up to about 10 microns.

A margarine with the above composition possesses a desirable combination of properties which is directly traceable to the nature of the oleaginous material in the margarine, referred to above and hereafter as an "oleaginous gel." These oleaginous gels are disclosed and claimed in co-pending application Ser. No. 544,695, filed concurrently herewith. The gels of the instant margarines have somewhat more specific characteristics than those broadly defined in the co-pending application. The gels are oleaginous compositions which are characterized by the presence of small beta-phase triglyceride hardstock particles relatively uniformly dispersed in a liquid glyceride vehicle.

Oleaginous gels can be distinguished from conventional plastic oleaginous systems in that these conventional plastic systems obtain their physical stability from interconnecting bonds which form between the hardstock particles, a physical network which entraps the liquid glycerides. In contrast, it is believed that the oleaginous gels derive their stability from the existence of Van der Waals-London forces—the attractive forces which exist between the small and closely packed hardstock particles. These bonding forces are more easily broken than the conventional interconnecting bonds; however, unlike the conventional bonds, the Van der Waals-London bonds will re-establish after they have been broken by mechanical action if the oleaginous gel is allowed to remain at rest for a short period of time.

The oleaginous gels produce unexpected results when used in margarine compositions. The eating quality of these margarines is not governed by the previously accepted SCI requirements described above. Specifically, the SCI of the oleaginous gels in the margarines of this invention remains relatively constant over the temperature range of 40° F.–100° F. Further, no waxy impression is experienced when these margarines are eaten, even at the higher hardstock levels which produce SCI's at body temperature substantially above those of prior art margarines. The reason for the retention of good eating quality in spite of the higher SCI is not known. One theorized explanation is that the particle size of the solid hardstock particles is so small that the particles are not readily detected by the tactile senses in the mouth of the consumer.

The most important property imparted by the oleaginous gels to the margarines disclosed herein is the relatively uniform and spreadable consistency which the margarines exhibit over the entire range of temperatures commonly encountered during use. Since the presence of the hardstock particles is not detrimental to the eating quality of the margarine, it is not necessary to use solid fats which melt as body temperature is approached. As a result, the presence of this uniform amount of hardstock particles at all use temperatures imparts to the margarine disclosed herein a relatively uniform consistency and spreadability. More specifically, since the Van der Waals-London bonds are relatively easily broken even at temperatures as low as 40° F., the margarines of this invention have a spreadable consistency even at refrigeration temperatures; and since the preponderance of the hardstock employed in the gel does not melt below about 100° F., sufficient bonding force exists at the higher use temperatures to enable the margarines to retain a reasonably spreadable consistency.

The hardstock particles of the oleaginous gel in the margarines of this invention are in the beta crystalline phase. It is preferred that at least about 90% of the crystals be in the beta phase; however, acceptable properties in the margarine are achieved when at least about 70% of the crystals are in the beta phase.

To achieve the beta-crystals with individual particle size of ten microns or less as is necessary for the production of the margarines of this invention, the proportions of beta-tending and non-beta-tending solid triglycerides as defined above, must be between about 1:4 and about 4:1, and are preferably between about 2:3 and about 3:2. Outside the above broad range the desirable reversible gel properties are not obtained in the oleaginous material. The desired beta crystals are obtained in-process by rapidly chilling a mixture of liquid glyceride and solid triglycerides in the method described below.

The liquid glyceride component of the oleaginous gel composition for use in the margarines of this invention can be any normally liquid glyceride oil or partially hydrogenated glyceride oil having an iodine value greater than about 75. Suitable glycerides can be obtained from animal, vegetable or marine sources, including naturally-occurring triglyceride oils and fats such as cottonseed oil, soybean oil, peanut oil, olive oil, palm oil, coconut oil, corn oil, rapeseed oil, sunflower seed oil, sardine oil, lard, tallow, and the like materials containing a substantial proportion of fatty acid groups having from about 12 to about 24 carbon atoms. Mixtures of the above materials also can be used. A preferred range of iodine values is from about 100 to about 120 and a preferred oil is partially hydrogenated soybean oil.

Examples of beta-phase-tending hardstocks which can be used in the solid triglyceride components are tristearin, tripalmitin, and symmetrical palmitodistearin. Hard fats which have been subjected to molecular rearrangement and hydrogenation processes whereby a major amount of tristearin or tripalmitin, for example, is caused to be present in the rearranged product can also be used. Other suitable triglyceride hardstocks having strong beta-phase tendencies can be derived from substantially completely hydrogenated fats and oils such as lard, sunflower seed oil, safflower seed oil, linseed oil, sesame seed oil, hazelnut oil, soybean oil, peanut oil, olive oil, corn oil, and other fats and oils having a substantial proportion of fatty acid groups having at least 8 carbon atoms in the molecule. The preferred beta-phase-tending hardstock is substantially completely hydrogenated soybean oil having an iodine value of about 8.

The preferred non-beta-phase-tending hardstock component of the triglyceride solids blend is substantially completely hydrogenated rapeseed oil having an iodine value of about 8. This material tends to crystallize in the beta-prime phase and is known to hinder the formation of beta-phase crystals in conventional shortenings. However it has been found that substantially completely hydrogenated rapeseed oil in combination with beta-phase-tending hardstock in the aforesaid proportions can be processed to form beta-phase oleaginous gels. Other non-beta-phase-tending hardstocks which can be used in preparing the margarines of this invention are substantially completely hydrogenated fats and oils having a substantial proportion of fatty acid groups having 20 to 24 carbon atoms such as mustard seed oil, crambe oil and fish oils such as salmon, herring, pilchard, whale, menhaden and sardine oils.

The minimum amount of the above described blend of solid triglyceride which can be used in the oleaginous gels for preparation of the margarines disclosed herein is about 2% by weight of the gel. Below this level the margarine will start to become too soft at higher temperatures, such as about 90° F. The maximum amount of solid triglyceride which can be used is 8% by weight of the oleaginous gel, for if this hardstock level is exceeded, the waxy impression when eaten will become noticeable. Preferably the amount of hardstock is from about 5% to 7% by weight of the gel.

The non-oleaginous components of the margarine can be present in varying amounts to suit individual tastes. To produce a desirable margarine product, the milk solids should constitute from about 1% to about 10% by weight, and the water from about 5% to about 50% by weight, of the margarine composition. Minor amounts of other components can also be present. Examples of minor ingredients are food coloring, flavor improvers, such as salt and butter or other flavors, and emulsifiers, such as mono- and diglycerides of fatty acids, polyglycerol esters of fatty acids, and lecithin. The minor ingredients can constitute up to a total of about 5% by weight of the margarine composition.

The preferred margarines of this invention are prepared from the following compositions, to which other minor ingredients can be added, if desired:

Milk solids _____ About 2% to about 5% by weight.
Water _____ About 10% to about 20% by weight.
Oleaginous gel, as
  defined above __ About 75% to about 85% by weight.

In preparing the margarines of this invention a critical factor is proper handling of the oleaginous material to form the desired gel. To obtain the necessary beta phase crystalline structure the mixture of liquid glyceride and solid triglyceride materials is heated to a temperature at which the normally solid components are in the liquid state, generally about 130° F. or above. Then the normally solid materials are recrystallized by rapidly chilling the mixture to less than about 85° F. in less than about 60 seconds. The solid triglycerides in the above mixture when processed as described above crystallize in-process in the beta-crystalline state.

This is in contrast to the normal process of preparing beta-crystalline oils and shortenings which involves either (a) crystallization of hardstock in the beta-prime phase followed by tempering, generally at temperatures of about 100° F. to about 120° F. for a number of hours or even a number of days, to allow the beta-prime crystals to change to beta crystals, or (b) slowly cooling (e.g., about five hours or longer) under agitation a melted mixture of solid triglyceride in liquid glyceride to form beta crystals.

The preferred method of preparation for the margarines disclosed herein comprises mixing and heating milk solids, water, and oleaginous ingredients, the oleaginous ingredients comprising liquid glyceride oil and a blend of melted triglyceride solids, the amount and nature of all ingredients being defined above; and then rapidly chilling the mixture to less than about 85° F. (preferably between about 40° F. and about 60° F.) in less than about 60 seconds (preferably less than 45 seconds) to form a margarine composition containing triglyceride solids having a stable beta crystalline phase with an individual particle size of about up to 10 microns.

The mixing step can be performed in any appropriately sized high speed mixer, such as a turbine agitated tank. The rapid chilling can be conducted in a freezer such as a scraped wall heat exchanger. A suitable device for this purpose, referred to as a "Votator," is described by Vogt, U.S. Reissue Patent 21,406, granted Mar. 19, 1940.

As an alternate method of preparation for the margarines of this invention, the oleaginous gel is formed first by melting the oleaginous ingredients and rapidly chilling them as described above. After the chilling step, the non-oleaginous ingredients are added and gently mixed into the oleaginous gel; for example, by the use of a conventional mixer such as a Hobart mixer or similar mechanical blender. This is a deviation from the prior art practice in which the milk solids and water customarily are added prior to the chilling step.

The following examples are given to demonstrate the preparation of the margarine of the invention disclosed herein. These examples are not intended to be limitations upon the invention. Unless stated otherwise, all ratios and percentages are by weight.

EXAMPLE I

Two hundred pound samples of two different oleaginous gel compositions were made, each being prepared in the following manner. The ingredients for the gel were placed in a steel mixing tank, and heated to about 150° F. under gentle agitation to melt the triglyceride solids. Each composition consisted of 95% by weight of a normally liquid glyceride oil (refined and bleached soybean oil, hydrogenated to iodine value 107) and 5% by weight of a combination of triglyceride hardstocks (refined, bleached and hardened soybean oil and rapeseed oil, each hydrogenated to iodine value 8) in the proportions specified below. Identifying the compositions by the proportion of soybean to rapeseed hardstocks in the hardstock mixture, the two compositions were:

| Composition: | Weight ratio of soybean to rapeseed hardstock |
|---|---|
| A | 2:3 |
| B | 3:2 |

Each composition was then rapidly chilled in a scraped wall heat exchanger to less than 85° F. in less than 20 seconds. X-ray diffraction of the two chilled compositions showed that the solid triglycerides in both compositions had crystallized in excess of 95% in the beta phase. The hardstock particles had individual sizes of up to about 10 microns. Compositions A and B were oleaginous gels, as described herein.

Each of oleaginous gel compositions A and B were used to prepare a margarine product in the following manner. To a 3-speed Hobart C-100 mixer were added the following ingredients, expressed as parts by weight:

| | Parts |
|---|---|
| Dry milk solids | 3 |
| Salt, flavoring and color | 1.5 |
| Lecithin | 0.5 |
| Water | 15 |

These ingredients were mixed at #3 speed until a uniform mixture was obtained. To this mixture were then added 80 parts by weight of the particular oleaginous gel composition and the speed was reduced to #1 speed. Mixing was continued until a uniform water-in-oil emulsion was obtained. One pound samples of each product were obtained and were stored at 40° F. and 70° F., respectively, for 24 hours at which time tests were performed to determine the consistency of each sample. Penetration readings were taken with an A.S.T.M. D-217 grease cone, and viscosities (in centipoises) were measured with a Brookfield R.V.T.-½ viscosimeter mounted on a helipath stand. Desirable values for the margarines of this invention are: penetration—about 200 to about 350 mm./100; viscosity—about 15,000 to about 400,000 centipoises. The results of the above tests were as follows:

TABLE 1

| Margarine composition | Storage temp. (° F.) | Penetration mm./100 | Viscosity (centipoises) |
|---|---|---|---|
| A | 40 | 309 | 91,000 |
|   | 70 | 330 | 59,000 |
| B | 40 | 333 | 42,000 |
|   | 70 | 345 | 29,000 |

When in the above example, the hardstock mixtures are replaced by hardstock mixtures in which the weight ratio of soybean to rapeseed hardstock is 1:4 and 4:1, substantially similar results are obtained in that oleaginous gels containing in excess of 70% beta phase hardstock particles with individual particle size of up to 10 microns are produced which have utility in preparing the margarines of this invention.

EXAMPLE II

Two hundred pound samples of three different oleaginous gel compositions were produced in the same manner as gel compositions A and B described in Example I. The liquid glyceride used in preparing each gel composition was refined and bleached soybean oil hydrogenated to iodine value 107. The normally solid triglyceride in each case was a 60:40 mixture (weight percent) of soybean and rapeseed hardstocks (prepared from refined, bleached and hardened soybean and rapeseed oils, each hydrogenated to iodine value 8). The proportions of normally liquid glyceride to triglyceride hardstock mixture in the oleaginous gel compositions were as follows, expressed as percent by weight.

| Gel composition | Liquid glyceride | Solid triglyceride |
|---|---|---|
| C | 97.5 | 2.5 |
| D | 95.0 | 5.0 |
| E | 92.00 | 8.0 |

After the rapid chilling, the hardstock particles in each gel were found to be in excess of 95% in the beta phase, and had individual particle sizes of up to about 10 microns.

Margarines were prepared from the above oleaginous gel compositions using the same components, proportions and method of preparation as in Example I. One pound samples of each margarine were again stored at 40° F. and 70° F. for 24 hours, following which the viscosity and penetration tests described in Example I were run. The results were as follows:

TABLE 2

| Margarine composition | Temp. (° F.) | Penetration mm./100 | Viscosity (centipoises) |
| --- | --- | --- | --- |
| C | 40 | 305 | 84,000 |
|   | 70 | 347 | 17,000 |
| D | 40 | 333 | 42,000 |
|   | 70 | 345 | 29,000 |
| E | 40 | 275 | 352,000 |
|   | 70 | 308 | 160,000 |

When in the above example the liquid soybean oil is replaced in whole or in part by cottonseed oil, peanut oil, olive oil, palm oil, coconut oil, corn oil, rapeseed oil, sunflower seed oil, sardine oil, lard, tallow and mixtures thereof, each having an iodine value greater than about 75; and/or the soybean hardstock is replaced in whole or in part by substantially completely hydrogenated lard, sunflower seed oil, hazelnut oil, peanut oil, olive oil, corn oil and mixtures thereof, each having an iodine value less than about 12; and/or the rapeseed hardstock is replaced in whole or in part by substantially completely hydrogenated mustard seed oil, crambe oil, salmon oil, herring oil, pilchard oil, whale oil, menhaden oil, sardine oil and mixtures thereof, each having an iodine value less than about 12; substantially similar results are obtained in that oleaginous gels containing predominantly beta phase hardstock particles with individual particle size of up to 10 microns are produced which have utility in preparing the margarines of this invention.

EXAMPLE III

An oleaginous gel composition was prepared which consisted of 92% by weight refined and bleached soybean oil hydrogenated to iodine value 107, and 8% by weight of a mixture by equal weights of soybean and rapeseed hardstocks (prepared from refined, bleached and hardened soybean oil and rapeseed oil, each hydrogenated to iodine value 8). The hardstock particles in the gel were in excess of 95% in the beta phase and had individual particle sizes of up to about 10 microns. Three margarine products were prepared from the above oleaginous gel composition using the same procedure as described in Example I and having the following approximate compositions, expressed as parts by weight:

|  | Margarine composition | | |
| --- | --- | --- | --- |
|  | F | G | H |
| Oleaginous gel | 70 | 80 | 90 |
| Water | 25 | 15 | 5 |
| Milk solids | 3 | 3 | 3 |
| Lecithin | 0.5 | 0.5 | 0.5 |
| Salt, flavoring and color | 1.5 | 1.5 | 1.5 |

One-pound samples of each margarine product were stored at temperatures of 40° F. and 70° F. for 24 hours, following which the penetration and viscosity tests of Example I were run. The results were as follows:

TABLE 3

| Margarine composition | Storage temp. (° F.) | Penetration mm./100 | Viscosity (centipoises) |
| --- | --- | --- | --- |
| F | 40 | 303 | 111,000 |
|   | 70 | 326 | 77,000 |
| G | 40 | 275 | 352,000 |
|   | 70 | 308 | 160,000 |
| H | 40 | 322 | 53,000 |
|   | 70 | 335 | 41,000 |

When in the above example, the 70 parts by weight of oleaginous gel and 25 parts by weight of water used in preparing margarine F are replaced by 45 parts by weight of the same oleaginous gel and 50 parts by weight water, an acceptable margarine product is produced. Further, when in each of margarines F, G and H, the 3 parts by weight milk solids are replaced by 1 part by weight milk solids and 10 parts by weight milk solids, acceptable margarine products are produced.

When margarines having the same composition as the margarines prepared from compositions F, G and H in the above example are prepared by mixing all the ingredients in a mixing tank, heating the mixture to melt the triglyceride solids and then rapidly chilling the mixture to less than 85° F. in less than 60 seconds, substantially similar results are obtained in that margarines of desirable consistency are produced which contain predominantly beta-phase hardstock crystals having an individual particle size of up to 10 microns.

EXAMPLE IV

The uniform spreadability of the margarines of this invention over a wide temperature range was compared to the spreadability characteristics of two leading commercial margarines. Samples of (a) a safflower seed margarine designed to retain spreadable consistency at low temperatures (hereinafter called margarine X) and (b) a conventional corn oil-soybean oil margarine marketed in foil-wrapped sticks (hereinafter called margarine Y) were obtained and samples of each were stored at temperatures 40° F., 70° F., and 100° F. Likewise, samples of each of the margarines prepared in the above three examples according to the present invention, i.e., margarine compositions, A, B, C, D, E, F, G and H, were stored at the same three temperatures. The table below lists all of these compositions and contains observations on the consistency of the various products at the different storage temperatures.

TABLE 4

| Margarine composition | 40° F. | 70° F. | 100° F. |
| --- | --- | --- | --- |
| X | Spreadable | Spreadable | Liquid. |
| Y | Too hard | do | Do. |
| A | Spreadable | Soft, but spreadable. | Soft, but spreadable. |
| B | do | Spreadable | Oil separation. |
| C | Soft but spreadable. | Soft but spreadable. | Soft but spreadable. |
| D | Spreadable | Spreadable | Spreadable. |
| E | do | do | Do. |
| F | do | do | Do. |
| G | do | do | Do. |
| H | do | do | Do. |

Each of margarine compositions A through H, inclusive, had acceptable appearance, flavor and eating quality, and were useful as spreads, for frying, and in other applications where margarines are commonly used.

What is claimed is:

1. A food spread comprising from about 1% to about 10% by weight milk solids, about 5% to about 50% by weight water, and from about 45% to about 90% by weight of an oleaginous gel having a stable beta crystalline phase comprising from 92% to about 98% by weight of liquid glyceride oil having an iodine value from about 100 to 120 and about 2% to 8% by weight of solid triglyceride having an iodine value not exceeding about 12, said solid triglyceride consisting essentially of a blend of (a) beta-phase-tending hardstock and (b) non-beta-phase-tending hardstock having a substantial portion of fatty acid groups having 20 to 24 carbon atoms, the weight proportion of (a) to (b) in said solid triglyceride blend ranging from about 1:4 to about 4:1, said solid triglycerides having stable individual crystal size up to about 10 microns and being at least about 70% in beta phase.

2. The composition of claim 1 wherein the liquid glyceride oil is selected from the group consisting of soybean oil, peanut oil, and cottonseed oil.

3. The composition of claim 1 in which the beta-phase-tending hardstock is substantially completely hydrogenated soybean oil.

4. The composition of claim 1 in which the non-beta-phase-tending hardstock is substantially completely hydrogenated rapeseed oil.

5. The composition of claim 1 which contains from about 2% to about 5% by weight milk solids, from about 10% to about 20% by weight water, and from about 75% to about 85% oleaginous gel.

6. The composition of claim 1 in which the oleaginous gel contains from about 5% to 7% by weight of solid triglyceride.

7. The method of preparing a food spread which comprises mixing and heating from about 1% to about 10% by weight milk solids, about 5% to about 50% by weight water, from about 45% to about 90% by weight of oleaginous ingredients, the oleaginous ingredients comprising from 92% to about 98%, by weight of liquid glyceride oil having an iodine value from about 100 to 120 and from about 2% to 8% by weight of melted triglyceride solid consisting essentially of a blend of (a) beta-phase-tending hardstock and (b) non-beta-phase-tending hardstock having a substantial portion of fatty acid groups having 20 to 24 carbon atoms, the weight proportion of (a) to (b) in said solid triglyceride blend ranging from about 1:4 to about 4:1; and then rapidly chilling the mixture to less than about 85° F. in less than about 60 seconds to form a margarine composition containing triglyceride solids having a stable beta-crystalline phase with an individual particle size of about up to 10 microns and being at least about 70% in beta phase.

8. The method of claim 7 in which the rapid chilling is conducted in less than about 45 seconds.

9. The method of claim 7 in which the mixture is chilled to a temperature between about 40° F. and about 60° F.

10. The method of claim 7 in which the liquid glyceride oil is selected from the group consisting of soybean oil, peanut oil, and cottonseed oil.

11. The method of claim 7 in which the beta-phase-tending hardstock is substantially completely hydrogenated soybean oil.

12. The method of claim 7 in which the non-beta-phase tending hardstock is substantially completely hydrogenated rapeseed oil.

13. The method of claim 7 in which the milk solids and water are mixed with the oleaginous ingredients after rapid chilling.

References Cited

UNITED STATES PATENTS 3,253,927   5/1966   Going et al. _____ 99—118

OTHER REFERENCES

Swern, Daniel: "Bailey's Industrial Oil and Fat Products," 3rd ed., 1964, Interscience Publ., New York, pp. 333–336.

MAURICE W. GREENSTEIN, *Primary Examiner.*

U.S. Cl. X.R.

99—123

PO-1050
(5/69)

UNITED STATES PATENT OFFICE
CERTIFICATE OF CORRECTION

Patent No. 3,425,842   Dated February 4, 1969

Inventor(s) Cornelis Japikse

It is certified that error appears in the above-identified patent and that said Letters Patent are hereby corrected as shown below:

"mm./100" should be -- mm./10 -- at the following locations in the patent: column 6, line 26; column 6, line 32; column 7, line 5; and column 7, line 60

SIGNED AND
SEALED
JAN 6 - 1970

(SEAL)
Attest:

Edward M. Fletcher, Jr.
Attesting Officer

WILLIAM E. SCHUYLER, JR.
Commissioner of Patents